United States Patent [19]

Tick

[11] 4,420,569

[45] Dec. 13, 1983

[54] ALKALI METAL ZIRCONOFLUOROPHOSPHATE GLASSES

[75] Inventor: Paul A. Tick, Corning, N.Y.

[73] Assignee: Corning Glass Works, Corning, N.Y.

[21] Appl. No.: 483,898

[22] Filed: Apr. 11, 1983

[51] Int. Cl.³ .......................... C03C 1/00; C03C 3/18
[52] U.S. Cl. ........................................ 501/30; 501/44; 501/903
[58] Field of Search ............... 501/44, 903, 30, 40

[56] References Cited

U.S. PATENT DOCUMENTS

| | | | |
|---|---|---|---|
| 2,481,700 | 9/1949 | Sun et al. | 501/44 |
| 4,141,741 | 2/1979 | Lucas et al. | 501/44 |
| 4,314,031 | 2/1982 | Sanford et al. | 501/903 |
| 4,328,218 | 5/1982 | Miranday et al. | 501/44 |
| 4,362,819 | 12/1982 | Olszewski et al. | 501/30 |

FOREIGN PATENT DOCUMENTS 36373  9/1981  European Pat. Off. .............. 501/40

Primary Examiner—Helen M. McCarthy
Attorney, Agent, or Firm—C. S. Janes, Jr.

[57] ABSTRACT

This invention is directed to the production of glasses within the $Li_2O$-$K_2O$-$ZrO_2$-F-$P_2O_5$ system having batch compositions as generally depicted in terms of mole percent in FIG. 2.

3 Claims, 2 Drawing Figures

ALKALI METAL ZIRCONOFLUOROPHOSPHATE GLASSES

BACKGROUND OF THE INVENTION

U.S. Pat. No. 4,362,819 discusses the current high interest in glasses demonstrating low transition temperatures, i.e., below about 350° C., but which also exhibit good chemical durability, resistance to weathering, and glass stability (resistance to devitrification and/or phase separation). The text of the patent is directed primarily to glasses within the alkali metal aluminofluorophosphate composition system.

That alkali metal fluorophosphate glasses inherently display low transition temperatures has been recognized for many years. Nevertheless, those glasses have generally evidenced poor durability and resistance to weathering such as to render them useful only in special, protected applications. Hence, U.S. Pat. No. 4,362,819 discloses the utility of carefully controlled contents and ratios of fluoride and alumina levels to achieve improved properties. Research has been continuous to formulate other fluorophosphate-based glasses also manifesting low transition temperatures coupled with advantageous chemical and physical properties.

The facility of $ZrO_2$ to improve the chemical durability of a glass composition is well known in the art. However, zirconium is a very complex cation which can exhibit three coordination numbers; viz., with a coordination number of six it functions as a glass former; with a coordination number of eight it behaves as an intermediate; and with a coordination number of seven in a fluorine environment it assumes a distorted octahedral geometry with the seventh fluorine ion lying in one face of the octahedron. Recently, zirconium has been asserted to comprise the primary glass forming cation in an all-fluoride system (Poulain, M. et al., "Verres Flores au Tetrafluorine de Zirconium Proprietes Optiques d'un Verre Dope au $Nd^{+3}$", *Materials Research Bulletin*, 10, No. 4, pages 243-246, April. 1975). Other disclosures of zirconium fluoride glasses include U.S. Pat. Nos. 4,141,741 and 4,328,218.

Because the coordination structure of zirconium is so varied, an investigation was undertaken to study its behavior in different glass forming systems.

SUMMARY OF THE INVENTION

It has been found that transparent glass bodies having refractive indices in the vicinity of 1.45, densities approximating 3.1 g/cm³, electrical resistivities on the order of $10^9$ ohm-cm, and transition temperatures below 200° C. and generally in the neighborhood of 150° C. can be prepared from a strictly-controlled, narrow interval of compositions within the $Li_2O$-$K_2O$-$ZrO_2$-F-$P_2O_5$ system. Thus, the boundaries in cation space are outlined in FIG. 1 and correspond to the batched stoichiometric relationship:

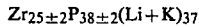

$$Zr_{25\pm2}P_{38\pm2}(Li+K)_{37}$$

wherein Li lies between 3-15 and K between 23-34. At high concentrations of fluorine, devitrification readily occurs with the major crystalline phase identified through X-ray diffraction analyses being $K_2Zr(PO_4)_3$. Where a fluorine-to-oxygen ratio (F:O) between 4.5-7.5 is utilized, clear glasses are produced. F:O values below 4.5 result in liquid-liquid phase separations causing the development of opal glasses. X-ray diffraction studies of the opal glasses indicates the absence of crystallization therein.

FIG. 2 is a ternary composition diagram $ZrO_2$-$LiPF_6$-$KPF_6$ illustrating the area of transparent glasses in terms of mole percent; that area encompassing approximately 6-20% $LiPF_6$, 40-54% $KPF_6$, and 38-42% $ZrO_2$.

DESCRIPTION OF PREFERRED EMBODIMENTS

Figure 1:
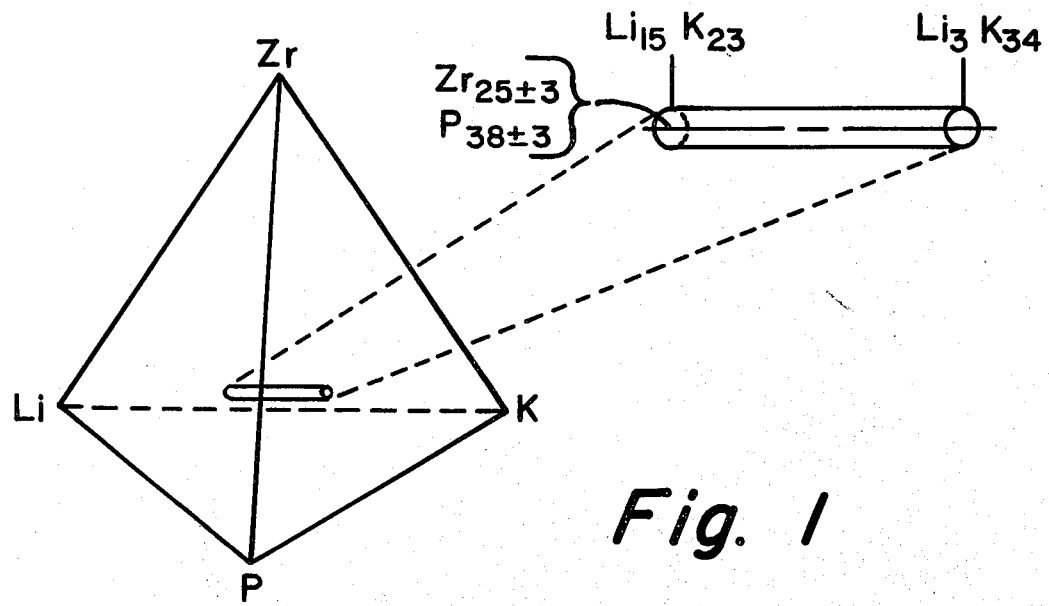
FIG. 1 depicts the composition bounderies of the inventive compositions in terms of cations.

Table I reports a number of glass forming batches, expressed in terms of parts by weight, which yielded clear glasses. Because the sum of the individual constituents totals 100, for practical purposes the values tabulated may be deemed to reflect weight percent. It will be appreciated that the batch materials recited in Table I are illustrative only and that other compounds can be utilized which, when melted together, will provide the desired overall compositions. Table I also records a number of physical properties determined on several of the exemplary compositions following methods conventional in the glass art. Thus, refractive index ($n_D$) was measured by the Becke line technique at 5893 Å; differential scanning calorimetry with a heating rate of 20° C./min. was employed to detect the transition temperature ($T_g$); density (Dens.), as expressed as g/cm³, was obtained by the Archimedes method with kerosene as the buoyant fluid; and electrical resistivity (E.R.) in terms of ohm-cm was determined by using air-dried silver electrodes in a two terminal configuration. Table IA lists the batches in terms of atomic ratios of the elements with the sum of the cations normalized to 100. The approximate F:O ratio is also reported.

The batch ingredients were compounded, tumble mixed together to aid in achieving a homogeneous melt, and charged into platinum crucibles. After covering with a platinum lid, the crucibles were introduced into a furnace operating at about 900° C. An exposure time of about ten minutes was sufficient to yield clear, fluid, seed-free melts which were poured onto steel plates to form a generally circular slab.

Depending upon the melting unit employed, the batch materials utilized, and the melting conditions involved, losses of phosphorus may range about 50-75% and those of fluorine over 20% and, perhaps, up to 50% by weight.

TABLE I

|  | 1 | 2 | 3 | 4 | 5 | 6 | 7 | 8 |
|---|---|---|---|---|---|---|---|---|
| ZrF$_4$ | 42.4 | 41.8 | 42.3 | — | — | — | — | — |
| ZrO$_2$ | — | — | — | 29.5 | 31.1 | 31.9 | 31.3 | 31.4 |
| LiPF$_6$ | 5.7 | 9.3 | 9.4 | 25.0 | 4.8 | 19.9 | 7.7 | 9.6 |
| KPF$_6$ | 34.8 | 34.3 | 32.1 | 45.5 | 64.1 | 48.2 | 61.0 | 59.0 |
| LiPO$_3$ | 2.3 | — | — | — | — | — | — | — |
| KPO$_3$ | 14.8 | 14.6 | 16.2 | — | — | — | — | — |
| Tg (°C.) | 150 | 150 | 150 | — | — | 150 | — | — |
| Density | 3.115 | 3.156 | 3.141 | — | — | — | — | — |
| n$_D$ | 1.444 | 1.433 | 1.442 | — | — | — | — | — |
| E.R. | — | — | — | — | — | — | — | 9.2 × 10$^8$ |

TABLE IA

|    | 1   | 2   | 3   | 4   | 5   | 6   | 7   | 8   |
|----|-----|-----|-----|-----|-----|-----|-----|-----|
| Zr | 25  | 25  | 25  | 23  | 25  | 25  | 25  | 23  |
| P  | 38  | 38  | 38  | 39  | 38  | 37  | 38  | 38  |
| Li | 6   | 6   | 6   | 15  | 3   | 14  | 5   | 6   |
| K  | 31  | 31  | 31  | 23  | 34  | 25  | 32  | 31  |
| F  | 235 | 250 | 231 | 236 | 225 | 224 | 225 | 225 |
| O  | 45  | 38  | 47  | 46  | 50  | 49  | 50  | 50  |
| F:O| 5.2 | 6.6 | 4.9 | 5.1 | 4.5 | 4.5 | 4.5 | 4.5 |

The final composition of Example 6, as determined via wet chemical analysis, is set forth in Table II in terms of cation percent.

TABLE II

|          | Zr | P  | K  | Li | F   | O  |
|----------|----|----|----|----|-----|----|
| Batched  | 25 | 37 | 25 | 14 | 224 | 49 |
| Analyzed | 32 | 12 | 36 | 20 | 157 | 51 |

As is evident from Table II, compounds such as $POF_3$ are apparently formed and volatilized during melting of the batch, thereby reducing the content of phosphorus by about two-thirds and the fluorine about 30%. The corrected stoichiometry of the glass becomes approximately $Zr_{3.2}P_{1.2}(Li+K)_{5.6}F_{15.7}O_{5.1}$ and suggests that the glasses produced by the inventive compositions are inverted.

Laboratory exploration has demonstrated that the substitution of any significant amount of Na for either Li or K results in phase separation of the glass. The inclusion of any substantial quantities of Al and/or BaO leads to rapid devitrification of the glass. Accordingly, those elements will be held essentially absent from the inventive compositions.

Figure 2:
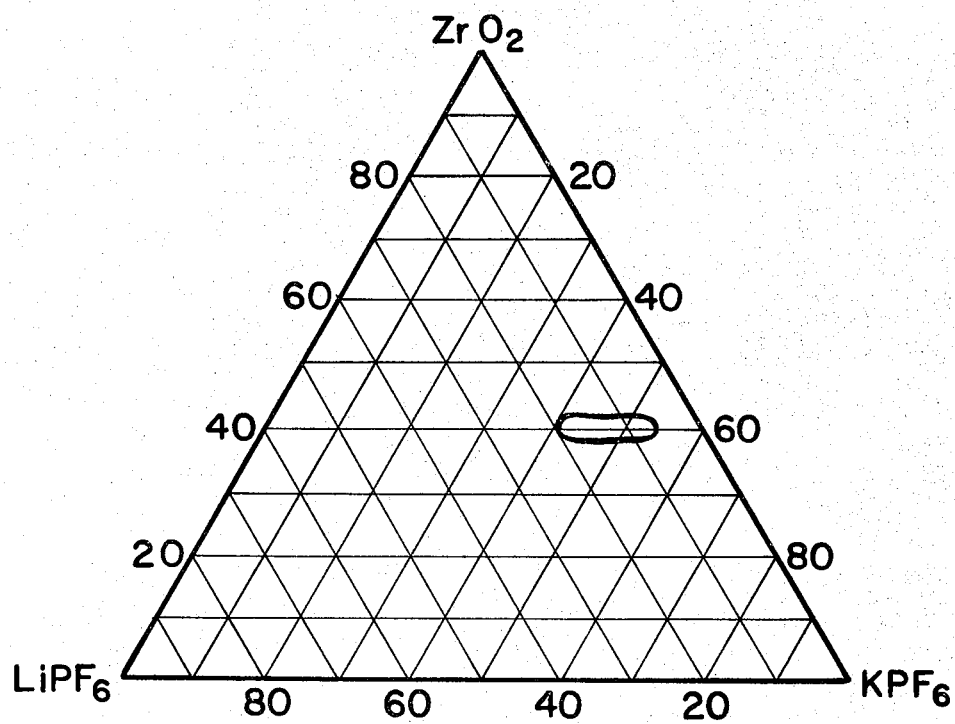
FIG. 2 is a ternary diagram setting forth the compositional limitations of the inventive glasses in terms of mole percent.

I claim:

1. A transparent glass having a refractive index in the vicinity of 1.45, a density in the area of 3.1 g/cm$^3$, an electrical resistivity on the order of 10$^9$ ohm-cm, and a transition temperature below 200° C. having a batch composition within the $Li_2O$-$K_2O$-$ZrO_2$-F-$P_2O_5$ system as generally depicted in terms of mole percent in FIG. 2.

2. A transparent glass according to claim 1 which is essentially free from the cations Al, Ba, and Na.

3. A transparent glass according to claim 1 having a stoichiometry, on a chemically analyzed basis, of about $Zr_{3.2}P_{1.2}(Li+K)_{5.6}F_{15.7}O_{5.1}$.

* * * * *